(12) United States Patent
Loh

(10) Patent No.: US 6,798,966 B2
(45) Date of Patent: Sep. 28, 2004

(54) DENSE WAVELENGTH DIVISION MULTIPLEXER MODULE

(75) Inventor: Frank Loh, Cupertino, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 135 days.

(21) Appl. No.: 10/286,714

(22) Filed: Nov. 1, 2002

(65) Prior Publication Data

US 2004/0086250 A1 May 6, 2004

(51) Int. Cl.⁷ ............................................ G02B 6/00
(52) U.S. Cl. .................... 385/134; 385/24; 385/135
(58) Field of Search ........................ 385/24, 53, 88, 385/134–139

(56) References Cited

U.S. PATENT DOCUMENTS 6,305,848 B1 * 10/2001 Gregory ................. 385/134 X
6,483,980 B1 * 11/2002 Wu et al. ................ 385/137

* cited by examiner

Primary Examiner—Phan T. H. Palmer
(74) Attorney, Agent, or Firm—Wei Te Chung

(57) ABSTRACT

A dense wavelength division multiplexer (DWDM) module (10) includes a housing (1), a retainer (2), a plurality of DWDMs (3), a cover (4), a gasket ring (5) and a front seal (8). The retainer is fixed in the housing and receives the DWDMs therein. Optical fibers communicating between the DWDMs and optical components outside the DWDM module pass through strain relief boots (81), which engage in through holes in a plug (82) of the front seal. The front seal is tightly fixed in a slot (124) of the housing, forming a reliable seal at the front of the housing. The gasket ring is pressed into a recess (122) of the housing. The cover is then fixed on the housing and presses against the gasket ring. Therefore, a tight hermetical seal is formed between the housing and the cover.

10 Claims, 3 Drawing Sheets

DENSE WAVELENGTH DIVISION MULTIPLEXER MODULE

BACKGROUND OF THE INVENTION

An example of a dense wavelength division multiplexer (DWDM) module is disclosed in a co-pending patent application, U.S. Ser. No. 10/022005, filed on Nov. 30. 2001, which is incorporated herein by reference.

1. Field of the Invention

This invention relates generally to a DWDM module and more particularly to a DWDM module which has an excellent seal and which is easy to manufacture.

2. Description of the Related Art

DWDM systems are widely deployed in modern communications networks. In a DWDM system, multiple channels are carried over a single optical fiber without interference between the channels, so that channel-carrying capacity is increased. A DWDM system includes a DWDM module that secures a plurality of DWDMs therein. DWDMs must be properly secured in the DWDM module, to ensure reliability and durability of the DWDM module. Various means have been developed for securing DWDMs.

A conventional DWDM module uses epoxy to secure DWDMs therein. Heat must be applied to the epoxy to cure it. This is time-consuming, generally 2 or 3 hours at a temperature of 110 degrees) and the epoxy resin degrades and loses its adhesive quality if exposed to changing in environmental conditions.

Thus for this and other reason, it is desired to provide an inexpensive DWDM module which is has excellent hermetic seal to provide a more stable environment for the DWDMs.

SUMMARY OF THE INVENTION

An object of the present invention is to provide a DWDM module which has an excellent hermetic seal to secure the stability of the DWDMs received therein.

In order to achieve the above object, a dense wavelength division multiplexer (DWDM) module according to the present invention includes a housing, a retainer, a plurality of DWDMs, a cover, a gasket ring and a front seal. The retainer is fixed in the housing and receives the DWDMs therein. The front seal is fittingly and tightly received in a front side of the housing. The gasket ring is pressed into a recess top of the housing. The cover engages with the top of the housing and presses against the gasket ring. Therefore, a tight hermetical seal is formed in the DWDM module.

Other objects, advantages and novel features of the present invention will be drawn from the following detailed description of a preferred embodiment of the present invention with attached drawings, in which:

DETAILED DESCRIPTION OF THE PREFERRED EMBODIMENT

Figure 1:
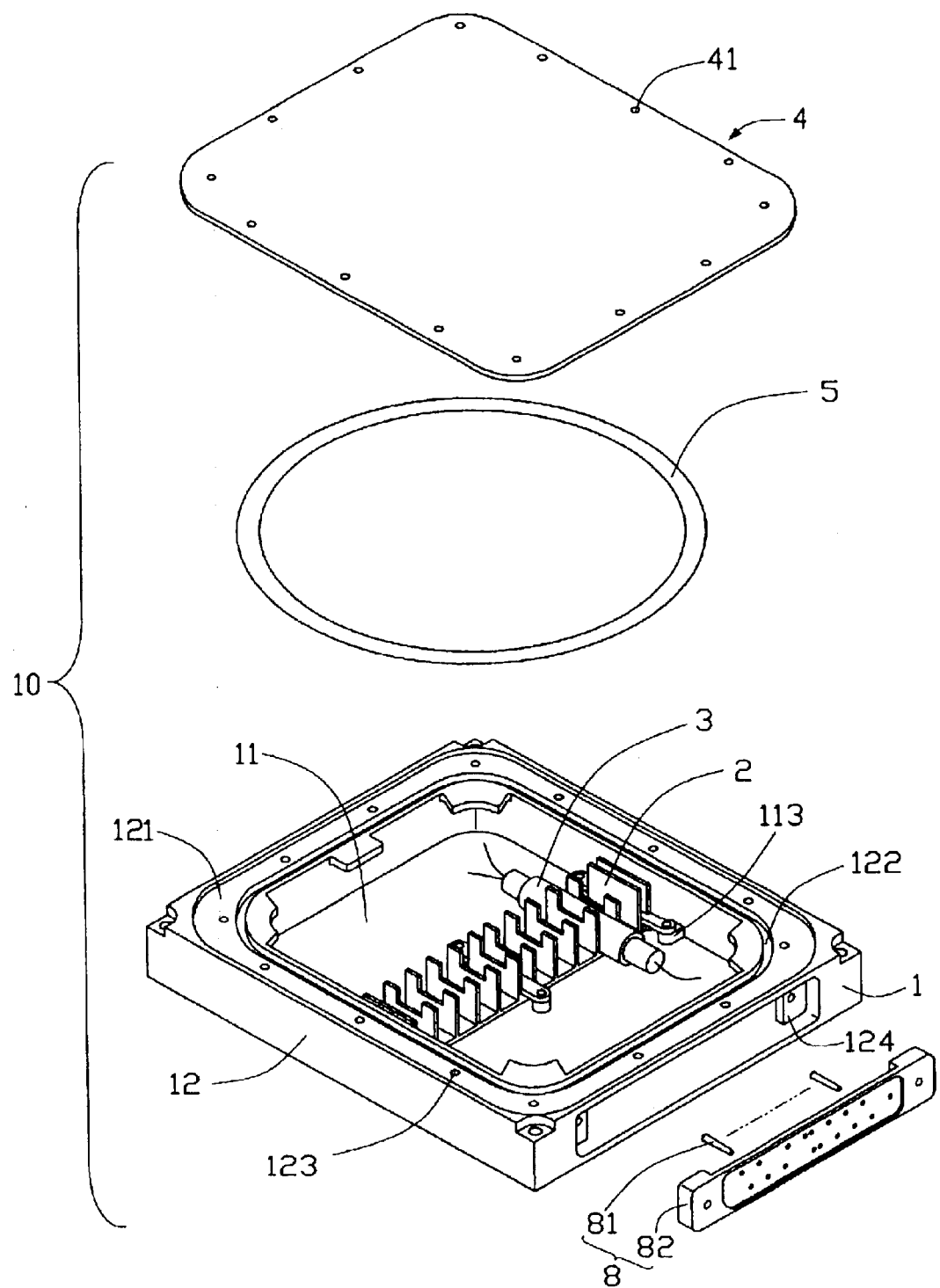
FIG. 1 is an exploded view of a DWDM module in accordance with the present invention.

Referring to FIG. 1, a DWDM module 10 in accordance with the present invention comprises a housing 1, a retainer 2, a plurality of DWDMs 3, a cover 4, a gasket ring 5, and a front seal 8.

Figure 3:
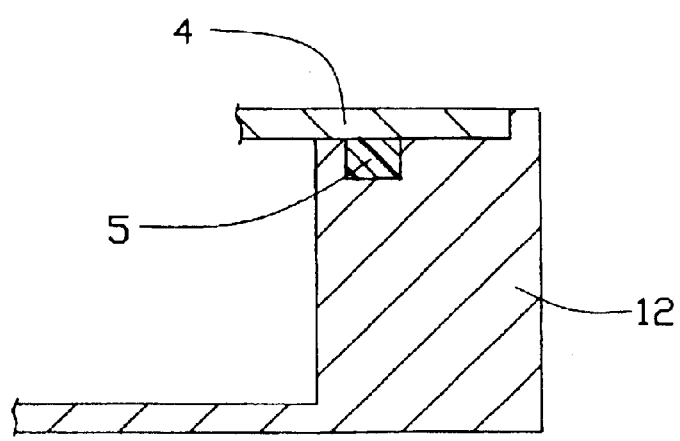
FIG. 3 is a cross-sectional view of a portion of the DWDM module of FIG. 2 taken along line III—III.

Referring particularly to FIGS. 1 and 3, the housing 1 comprises a rectangular bottom plate 11 with a peripheral frame 12 extending upwardly from edges of the bottom plate 11. A mounting seat 121 is formed recessed from a top surface (not labeled) of the frame 12, and a gasket recess 122 is defined downwardly in the mounting surface 121 for accepting the gasket ring 5 therein. A plurality of screw holes 123 is defined from the mounting seat 121 into the frame 12 around a periphery of the gasket recess 122 for engagingly receiving screws (not shown) therein. Three pairs of mounting projections 113 upwardly extend from the bottom plate 11 to provide mounting points for the retainer 2. A slot 124 is defined through a front side of the frame 12 for allowing entry of optical fibers (not shown) thereon.

Referring to FIG. 1, the front seal 8 comprises a strain relief boot 81 and a plug 82. The plug 82 is made of an elastic material and defines a plurality of through holes (not labeled) therethrough. Each strain relief boot 81 is retained in a corresponding through hole of the plug 82 and protects an individual optical fibers (not shown) passing therethrough.

Figure 4:
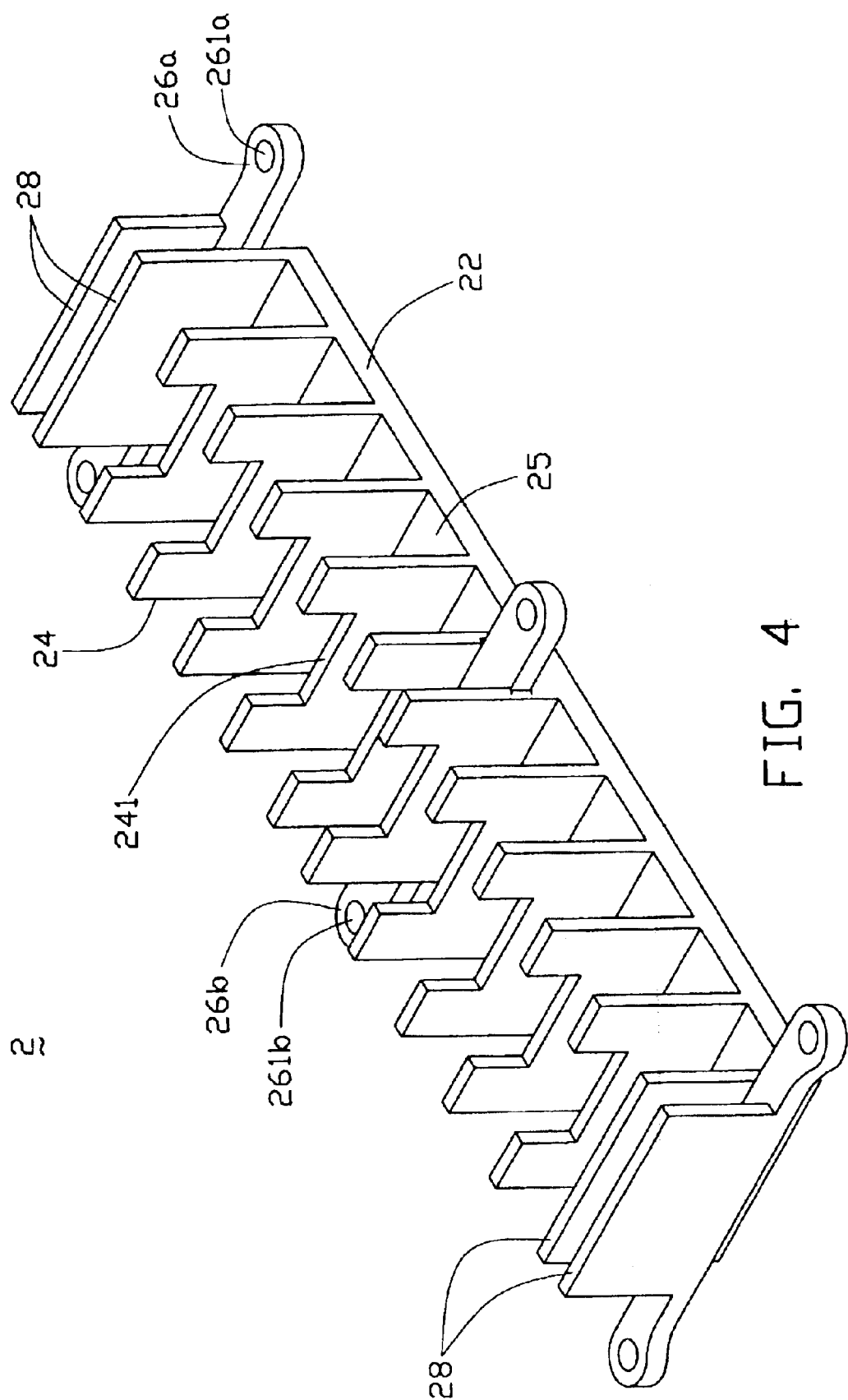
FIG. 4 is a perspective view of a retainer of the DWDM module.

Referring to FIG. 4, the retainer 2 comprises a substrate 22, a plurality of protrusions 24 extending upwardly from the substrate 22, two transverse mounting beams 26a formed at two ends of the retainer 2, a middle transverse mounting beam 26b formed at a middle of the substrate 22, and two pair of guarding walls 28 extending respectively upwardly from two ends of the substrate 22 and from outside edges of the transverse mounting beams 26a. The guarding walls 28 provide routing grooves 29 for protecting optical fibers connecting with the DWDMs 3 from bending too sharply. A pair of screw holes 261a, 261b is respectively defined through each of the transverse mounting beams 26a and the middle beam 26b. The substrate 22 and each pair of opposing protrusions 24 form a passage 25 in which to fix a DWDM 3. A cutout 241 is defined in an upper portion of each protrusion 24.

The cover 4 is a flat, rectangular plate and defines a plurality of screw holes 41 therethrough which correspond to the screw holes 123 of the housing 1.

The gasket ring 5 is made of an elastic material, such as plastic or rubber.

Figure 2:
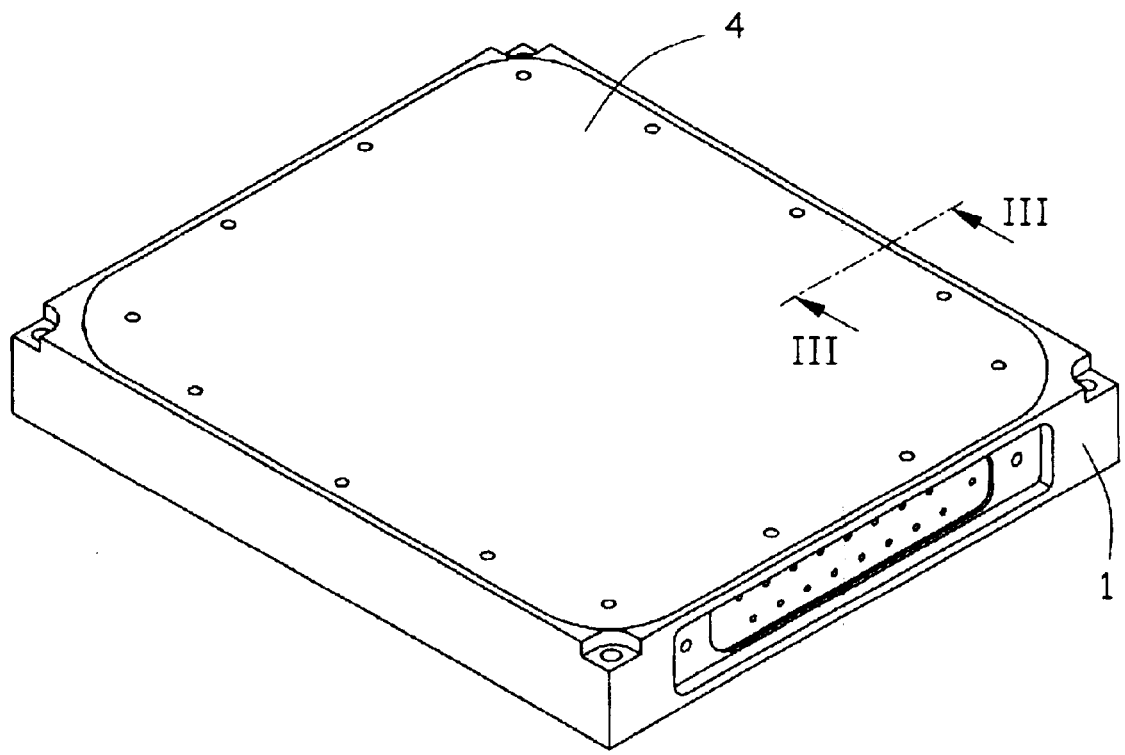
FIG. 2 is a perspective view of the assembled DWDM module of FIG. 1.

Referring to FIGS. 1–3, in assembly, the retainer 2 mounts in the housing 1 with the mounting beams 26a and 26b of the retainer 2 being attached to the mounting projections 113 on the bottom plate 11. The screw holes 261 a and 261b are aligned with corresponding screw holes (not shown) in the mounting projections 113 and screws (not shown) are inserted through the screw holes 261a and 261b, and into the screw holes of the mounting projections 113. The DWDMs 3 are pressed into corresponding passages 25 of the retainer 2 and epoxy is fed over the cutouts 241 of the retainer 2 and into the passage 25. After the epoxy is cured, the DWDMs 3 are fixed in the retainer 2. The DWDMs 3 communicate with each other and with other optical component. Some of the optical fibers coupled with the DWDMs 3 extend through the slot 124 and the front seal 8 of the housing 1 to communicate with elements outside the DWDM module 10 (not shown). Each of such optical fibers extends through a corresponding strain relief boot 81, and the strain relief boots 81 engaged with through holes (not labeled) through the plug 82. The plug 82 is then tightly fixed in the slot 124, forming an excellent seal between the plug 82 and the housing 1. The gasket ring 5 is then secured in the recess 122 of the housing 1. Finally, the cover 4 is seated in the mounting seat 121 of the housing 1, the screw holes 41 of the cover 4 are aligned with the screw holes 123 of the housing 1. Screws (not shown) then fix the cover 4 to the housing 1 through the aligned screw holes 41 and 123. The cover 4 and the housing 1 are thereby firmly secured together. The cover 4 presses against the gasket ring 5. Therefore, a tight seal is provided between the cover 4 and the housing 1.

The advantage of the present invention is that, by using the gasket ring 5 and the front seal 8, an excellent hermetical seal is provided for the DWDM module 10. Therefore, the DWDMs 3 in the housing 1 are isolated from humidity and contaminants, and the epoxy retaining the DWDMs 3 in the retainer 2 will not degrade and, allow DWDMs 3 to loosen, so that DWDMs 3 are reliably fixed in place in the DWDM module 10.

Although the present invention has been described with specific terms, it should be noted that the described embodiments are not necessarily exclusive, and that various changes and modifications may be made thereto without departing from the scope of the present invention as defined in the appended claims.

What is claimed is:

1. A dense wavelength division multiplexer (DWDM) module, comprising:
   a housing having a bottom plate and a peripheral frame extending upwardly from edges of the bottom plate, a recess being defined in the frame;
   a plurality of dense wavelength division multiplexers;
   a retainer mounting on the bottom plate of the housing, a plurality of grooves being defined in the retainer and the dense wavelength division multiplexers being received therein;
   a cover being mounted to the housing; and
   a gasket ring pressed into the recess of the frame of the housing;
   wherein the cover presses against the gasket ring, thereby forming a tight hermetical seal between the cover and the housing of the DWDM module.

2. The dense wavelength division multiplexer module as described in claim 1, wherein a slot is described through one side of the frame of the housing, and a front seal is fittingly securing thereinto.

3. The dense wavelength division multiplexer module as descried in claim 2, wherein the front seal includes a plug and a plurality of strain relief boots.

4. The dense wavelength division multiplexer module as descried in claim 3, wherein the plug is made of an elastic material.

5. The dense wavelength division multiplexer module as described in claim 1, wherein the DWDMs are fixed in the grooves of the retainer using epoxy.

6. The dense wavelength division multiplexer module as descried in claim 1, wherein a mounting seat is formed recessed from a top surface of the frame, and the recess is defined in the mounting seat of the frame.

7. The dense wavelength division multiplexer module as described in claim 1, wherein the gasket ring is made of an elastic material.

8. The dense wavelength division multiplexer module as described in claim 1, wherein the cover is fixed to the frame of the housing using screws.

9. A dense wavelength division multiplexer (DWDM) module, comprising:
   a housing having a bottom plate and a peripheral frame extending upwardly from a periphery of the bottom plate;
   a mounting seat downwardly recessed from a top face of the frame;
   a loop-like recess downwardly recessed from the mounting seat;
   a plurality of dense wavelength division multiplexers retainably located in the housing;
   a loop-like gasket ring received with the recess; and
   a cover being mounted unto the mounting seat and pressing the gasket ring downwardly to form sealing between the cover and the housing.

10. The module as described in claim 9, wherein a plurality of screws surround said gasket ring to fasten the cover and the housing together.

* * * * *